United States Patent [19]
Berger

[11] Patent Number: 5,951,044
[45] Date of Patent: Sep. 14, 1999

[54] METHOD OF FABRICATING A GAS BAG FOR A VEHICULAR OCCUPANT RESTRAINT SYSTEM AND GAS BAG

[75] Inventor: Jürgen Berger, Mutlangen, Germany

[73] Assignee: TRW Occupant Restraint Systems GmbH, Alfdorf, Germany

[21] Appl. No.: 08/896,248

[22] Filed: Jul. 17, 1997

[30] Foreign Application Priority Data

Jul. 23, 1996 [DE] Germany .............. 196 29 759

[51] Int. Cl.$^6$ .................................................. B60R 21/20
[52] U.S. Cl. ........................................................ 280/743.1
[58] Field of Search .......................................... 280/743.1

[56] References Cited

U.S. PATENT DOCUMENTS

| | | | |
|---|---|---|---|
| 3,810,654 | 5/1974 | DeBano, Jr. et al. | 280/728.1 |
| 5,114,180 | 5/1992 | Kami et al. | 280/743.1 |
| 5,193,847 | 3/1993 | Nakayama et al. | 280/743.1 |
| 5,205,583 | 4/1993 | Henseler et al. | 280/743.1 |
| 5,253,892 | 10/1993 | Satoh | 280/743.1 |
| 5,358,273 | 10/1994 | Onishi et al. | 280/743.1 |

FOREIGN PATENT DOCUMENTS 2160959   6/1972  Germany .
90138279  1/1991  Germany .

*Primary Examiner*—Kenneth R. Rice
*Attorney, Agent, or Firm*—Tarolli, Sundheim, Covell, Tummino & Szabo

[57] ABSTRACT

A method of fabricating a gas bag for a vehicular occupant restraint system, the gas bag having an inner side and an outer side and being formed by fabric portions having margins which overlap each other, comprises a first step in which a seam is formed along a substantial portion of the margins at the inner side of the gas bag or between the inner side and the outer side thereof. The method further comprises a second step in which the remaining portion of the margins is closed by a seam formed only from the outer side. A gas bag which can be formed by means of the method described above, has an inner side and an outer side and is formed by fabric portions having margins which overlap each other. The margins are connected to each other by means of a seam. The margins have a first part which, when the gas bag is deployed, faces a vehicle occupant, and a second part corresponding to the remainder of the margins. The seam is formed from the inner side or between the inner side and the outer side of the gas bag in the first part of the margins, and from the outer side in the second part of the margins.

5 Claims, 2 Drawing Sheets

METHOD OF FABRICATING A GAS BAG FOR A VEHICULAR OCCUPANT RESTRAINT SYSTEM AND GAS BAG

The invention relates to a method of fabricating a gas bag for a vehicular occupant restraint system. Further, the invention relates to a gas bag which can be formed by this method.

BACKGROUND OF THE INVENTION

Conventional gas bag are formed from fabric portions which are connected to each other by means of seams which are arranged at the margins of the fabric portions. When in fabricating gas bags several fabric portions are stitched to each other at the outer side of the gas bag a protruding seam and protruding margins of fabric materialize which due to their relative hardness or stiffness may pose a risk for the occupant. This is why, usually, the seam is disposed in the interior of the gas bag. This is achieved by turning the gas bag inside out through the deployment orifice. Another possibility consists of configuring the seam flat so that it hugs the periphery of the gas bag when deployed. This solution necessitates, however, a complicated stitching technique since the stitching device needs to engage through the deployment orifice into the gas bag so that the seam can be formed at the inner side or between the outer side and the inner side of the gas bag.

BRIEF DESCRIPTION OF THE INVENTION

The invention provides a method of fabricating a gas bag for a vehicular occupant restraint system. The gas bag has an inner side and an outer side and is formed by fabric portions having margins which overlap each other. The method comprises a first step in which a seam is formed along a substantial part of the margins at the inner side of the gas bag or between the inner side and the outer side thereof. The method further comprises a second step in which the remaining part of the margins is closed by a seam formed only from the outer side. Further, the invention provides a gas bag which can be formed by means of the method described above. The has an inner side and an outer side and is formed by fabric portions having margins which overlap each other. The margins are connected to each other by means of a seam. The margins have a first part which, when the gas bag is deployed, faces a vehicle occupant, and a second part corresponding to the remainder of the margins. The seam is formed from the inner side or between the inner side and the outer side of the gas bag in the first part of the margins, and from the outer side in the second part of the margins. Thus, in a method according to the invention neither turning the gas bag inside out through the deployment orifice nor stitching through the deployment orifice is necessary. This is particularly of significance since due to the development of increasingly more compact vehicular occupant restraint system, the deployment orifice for the gas bag is becoming smaller all the time.

BRIEF DESCRIPTION OF THE INVENTION

The invention will now be described with reference to a preferred embodiment illustrated in the attached drawing in which.

DETAILED DESCRIPTION OF THE INVENTION

Figure 1:
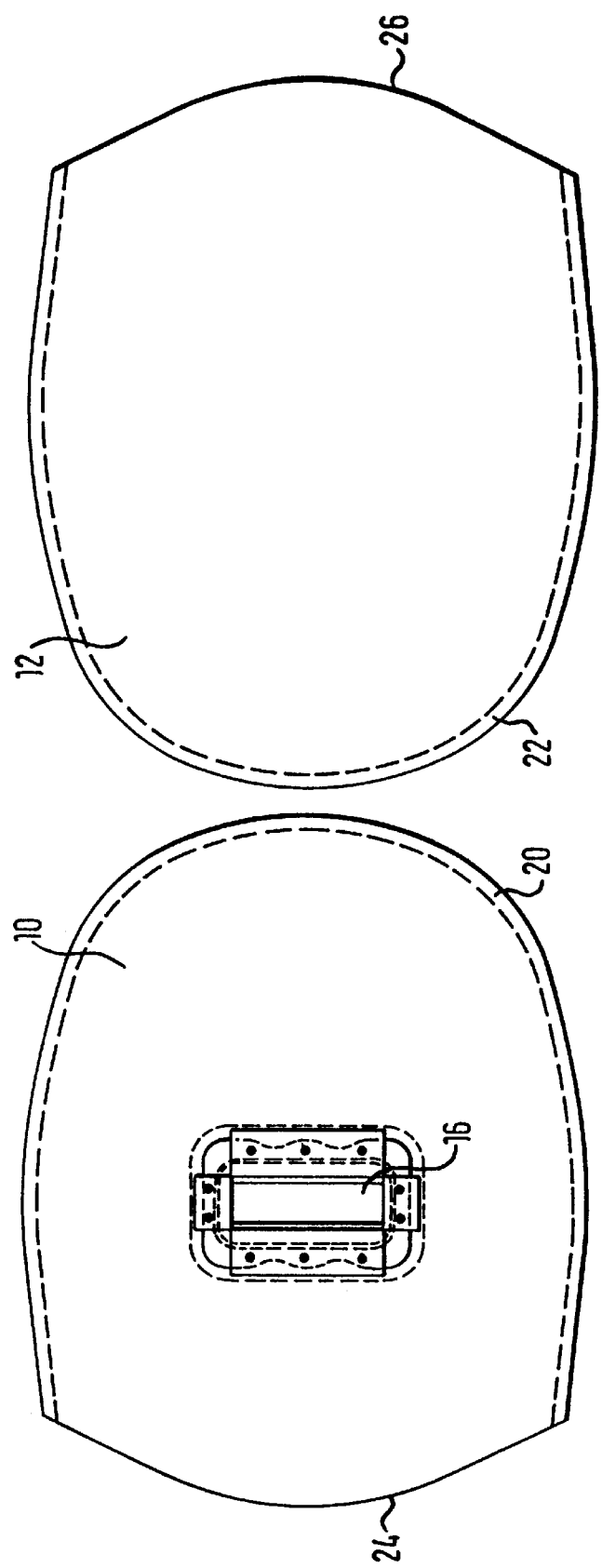
FIG. 1 is a schematic plan view of two fabric portions which may be joined together by a method according to the invention into a gas bag according to the invention.
Figure 2:
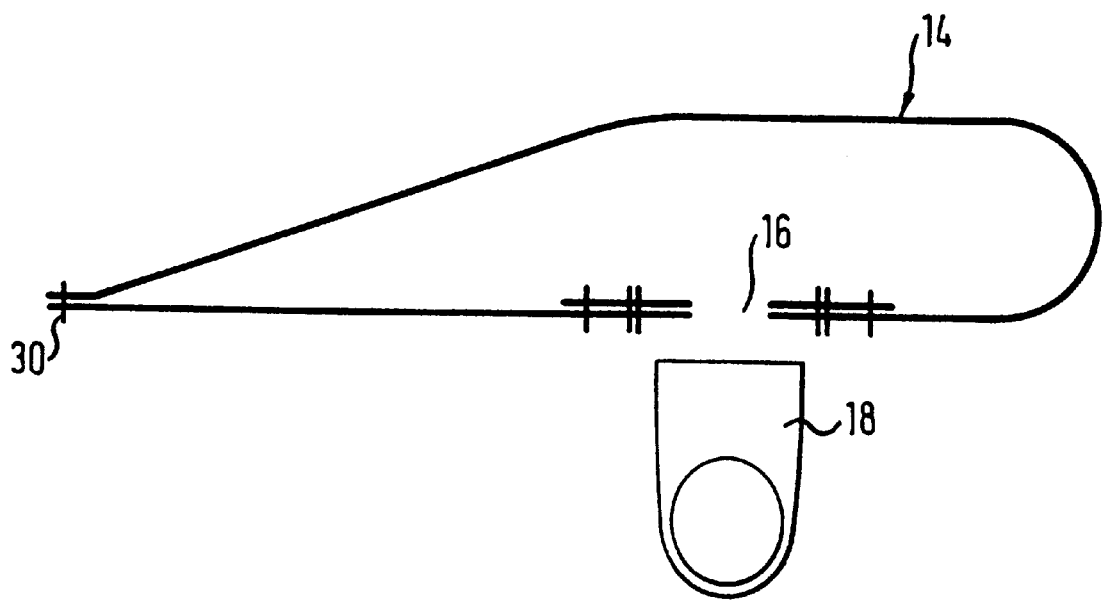
FIG. 2 is a schematic cross-section of a gas bag according to the invention fabricated by a method according to the invention.

In FIG. 1, in a schematic plan view, two fabric portions 10 and 12 are illustrated which can be joined by stitching their margins to form a gas bag 14. A gas bag of this type is shown in FIG. 2. However, the embodiment shown in FIG. 2 differs from the embodiment shown in FIG. 1 in that the two fabric portions are formed integrally by connecting those parts of the fabric portions which face each other in the embodiment shown in FIG. 1. The gas bag 14 has a deployment orifice 16 via which the interior space of the gas bag can be filled by a gas generator 18 (FIG. 2).

The two fabric portions 10, 12 are joined to each other by, in a first step, a substantial portion of the margins of the gas bag being stitched to each other. In the embodiment shown in the drawing the first step is executed along parts of the margins identified by the reference numerals 20 and 22. The part 20, 22 of the margins may be stitched either at the inner side of the gas bag 14 or between the inner side and the outer side of the gas bag 14.

Figure 3:
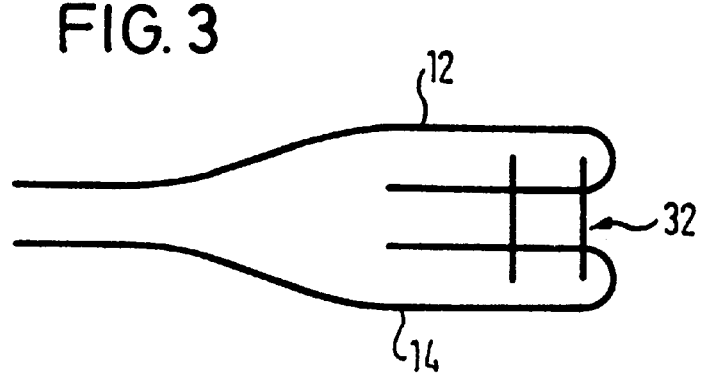
FIG. 3 is a schematic cross-section of a seam formed at the inner side of the gas bag for joining the fabric portions shown in FIG. 1.

When the part 20, 22 of the margins are stitched to each other at the inner side of the gas bag 14 a seam 32 materializes as illustrated in FIG. 3. Prior to stitching the margins were overlapping in the same sense, i.e. with coincident outer edges. Joining in this way has the advantage that both the seam 32 and the outer edges of the fabric portions 10, 12 are located totally in the interior space of the gas bag.

Figure 4:
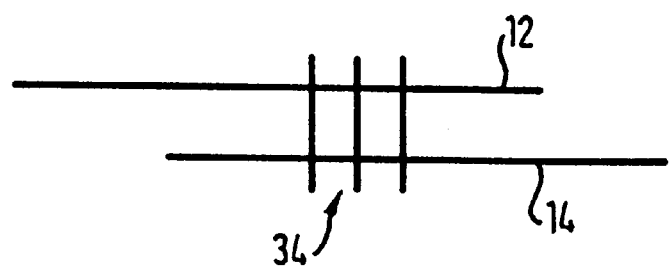
FIG. 4 is a schematic cross-section of a seam formed between the inner side and the outer side of the gas bag for joining the fabric portions shown in FIG. 1.

If, by contrast, the parts 20, 22 of the margins are stitched to each other between the inner side and the outer side of the gas bag 14, a seam 34 materializes as is illustrated in FIG. 4. Prior to stitching the margins are located one on the other in the opposite sense, i.e. each outer edge of a fabric portion is located on the other fabric portion. Joining in this way has the advantage that a seam materializes capable of withstanding very high loading without the outer edges of the fabric portions 10, 12 protruding outwards.

In a second step the remaining portion of the margins is closed by a seam 30 formed only from the outer side. In the embodiment illustrated in the drawing these are the parts of the margins identified by the reference numerals 24 and 26, these being overlapping in the same sense for stitching.

The seam 32 formed at the inner side of the gas bag 14 or the seam 34 formed between the inner side and the outer side faces a vehicle occupant to be protected in the case of a gas bag incorporated and deployed in a vehicle since due to its configuration it cannot result in any risk for a vehicle occupant; whereas the seam 30 formed only from the outer side faces away from the vehicle occupant, i.e. for example facing the windshield or the dashboard so that the outer edges of the fabric portions 10, 12 protruding outwards in the region of the seam 30 and the seam itself are not a nuisance.

Since in the method according to the invention neither stitching through the deployment orifice nor turning inside out of the gas bag through the deployment orifice is done, the seams in the method according to the invention may be configured without consideration to the spatial restriction formed by the deployment orifice. For example, the seams may be formed with greater strength, it furthermore being possible in the first and second step to employ differing seams specially adapted to the requirements existing in each case in the corresponding margin.

I claim:

1. A method of fabricating a gas bag for a vehicular occupant restraint system, said gas bag having an inner side and an outer side and being formed by two fabric portions having margins which overlap each other, said method comprising a first step in which a seam is formed along a substantial part of said margins at said inner side of said gas bag or between said inner side and said outer side thereof, and a second step in which the remaining part of said margins is closed by a seam formed only from said outer side without said gas bag being turned inside out prior to closing said remaining part of said margins.

2. The method of claim 1, wherein said margins, which are stitched to each other in said first step, overlap each other in the same sense.

3. The method of claim 1, wherein said margins, which are stitched to each other in said first step, overlap each other in the opposite sense.

4. The method of claim 1, wherein said margins, which are stitched to each other in said second step, overlap each other in the same sense.

5. A gas bag for a vehicular occupant restraint system, said gas bag having an inner side and an outer side and being formed by two fabric portions having margins which overlap each other, said margins being connected to each other by means of a seam, said margins having a first part which, when said gas bag is deployed, faces a vehicle occupant, and a second part corresponding to the remainder of said margins, wherein said seam is formed from said inner side or between said inner side and said outer side of said gas bag in said first part of said margins, and from said outer side in said second part of said margins.

* * * * *